United States Patent
Shibata et al.

(10) Patent No.: US 10,384,301 B2
(45) Date of Patent: Aug. 20, 2019

(54) SLIDING COMPONENT, METHOD FOR PRODUCING SLIDING COMPONENT, AND DEVICE FOR PRODUCING SLIDING COMPONENT

(71) Applicant: KOMATSU LTD., Tokyo (JP)

(72) Inventors: Yoshitaka Shibata, Hirakata (JP); Masaharu Amano, Hirakata (JP); Takuya Tsumura, Nago (JP); Kazuhiro Nakata, Osaka (JP)

(73) Assignee: KOMATSU LTD., Tokyo (JP)

( * ) Notice: Subject to any disclaimer, the term of this patent is extended or adjusted under 35 U.S.C. 154(b) by 276 days.

(21) Appl. No.: 15/023,739

(22) PCT Filed: Oct. 16, 2013

(86) PCT No.: PCT/JP2013/078101
§ 371 (c)(1),
(2) Date: Mar. 22, 2016

(87) PCT Pub. No.: WO2015/056315
PCT Pub. Date: Apr. 23, 2015

(65) Prior Publication Data
US 2016/0228977 A1 Aug. 11, 2016

(51) Int. Cl.
*B23K 20/12* (2006.01)
*F04B 1/12* (2006.01)
(Continued)

(52) U.S. Cl.
CPC ............. *B23K 20/12* (2013.01); *B32B 7/02* (2013.01); *B32B 15/015* (2013.01);
(Continued)

(58) Field of Classification Search
None
See application file for complete search history.

(56) References Cited

U.S. PATENT DOCUMENTS 5,698,751 A 12/1997 Ishida et al.
5,766,778 A * 6/1998 Deicke ............... B32B 15/015
384/912
(Continued)

FOREIGN PATENT DOCUMENTS

CN 1281533 A 1/2001
CN 1479011 A 3/2004
(Continued)

OTHER PUBLICATIONS

Welding Handbook—Welding Processes, Part 2, Chapter 6—Friction Welding (2007), American Welding Society, Ninth Edition—vol. 3, pp. 184-209. (Year: 2007).*
(Continued)

*Primary Examiner* — Adam Krupicka
(74) *Attorney, Agent, or Firm* — Oliff PLC

(57) ABSTRACT

A piston shoe as a sliding component includes a base section, which is made of steel, and a sliding section having a sliding surface, which is made of copper alloy and joined to the base section. The base section and the sliding section are joined, with a base section joint region being formed in the base section, the base section joint region including a base section joint surface that is a surface joined to the sliding section and having smaller grains than other regions in the base section.

11 Claims, 11 Drawing Sheets

(51) Int. Cl.
　　　F03C 1/28　　　(2006.01)
　　　F04B 27/08　　　(2006.01)
　　　B32B 7/02　　　(2019.01)
　　　B32B 15/01　　　(2006.01)
　　　B23K 101/00　　(2006.01)
　　　B23K 103/04　　(2006.01)
　　　B23K 103/12　　(2006.01)

(52) U.S. Cl.
　　　CPC .......... *F03C 1/0605* (2013.01); *F04B 1/124* (2013.01); *F04B 1/126* (2013.01); *F04B 27/0886* (2013.01); *B23K 2101/003* (2018.08); *B23K 2103/05* (2018.08); *B23K 2103/12* (2018.08); *B32B 2250/02* (2013.01); *B32B 2307/536* (2013.01); *B32B 2307/746* (2013.01)

(56) References Cited

U.S. PATENT DOCUMENTS

| | | | |
|---|---|---|---|
| 5,837,791 | A | 11/1998 | Sagane et al. |
| 6,237,465 | B1 | 5/2001 | Forster et al. |
| 6,425,314 | B1 | 7/2002 | Kleinedler et al. |
| 6,471,113 | B1 | 10/2002 | Hirayama et al. |
| 2004/0052649 | A1 | 3/2004 | Murase et al. |
| 2009/0166395 | A1* | 7/2009 | Nakata ............... B23K 20/1235 228/112.1 |
| 2011/0107908 | A1 | 5/2011 | Hatta et al. |
| 2012/0020600 | A1* | 1/2012 | Nishimura ............... C22C 9/04 384/322 |
| 2013/0333200 | A1 | 12/2013 | Ishizaki et al. |

FOREIGN PATENT DOCUMENTS

| | | |
|---|---|---|
| CN | 102066753 A | 5/2011 |
| DE | 102009021850 A1 | 3/2010 |
| JP | H06-2613 A | 1/1994 |
| JP | H07-167041 A | 7/1995 |
| JP | H07-247177 A | 9/1995 |
| JP | H10-89241 A | 4/1998 |
| JP | H11-58034 A | 3/1999 |
| JP | 2000-034974 A | 2/2000 |
| JP | 2001-41150 A | 2/2001 |
| JP | 2002-500307 A | 1/2002 |
| JP | 2007-136499 A | 6/2007 |
| JP | 2010-133320 A | 6/2010 |
| JP | 2012-041601 A | 3/2012 |
| JP | 2012-057213 A | 3/2012 |
| JP | 2012-179649 A | 9/2012 |
| JP | 5184320 B2 | 4/2013 |
| WO | 2007/086885 A2 | 8/2007 |
| WO | 2009/157267 A1 | 12/2009 |

OTHER PUBLICATIONS

Jan. 21, 2014 Search Report issued in International Patent Application No. PCT/JP2013/078101.

* cited by examiner

FIG.9

SLIDING COMPONENT, METHOD FOR PRODUCING SLIDING COMPONENT, AND DEVICE FOR PRODUCING SLIDING COMPONENT

TECHNICAL FIELD

The present invention relates to sliding components, methods for producing sliding components, and devices for producing sliding components. More specifically, the present invention relates to a sliding component which includes a sliding section made of copper alloy and a base section made of steel or cast iron and joined to the sliding section, a method for producing the sliding component, and a device for producing the sliding component.

BACKGROUND ART

As a sliding component which slides with respect to another component, one having a structure in which a sliding section made of copper alloy and having a sliding surface is fixed to a base section made of steel or cast iron may be used. For example, as a piston shoe of a hydraulic pump or a hydraulic motor, one having a base section made of steel to which a sliding section made of copper alloy is fixed is known. As a piston shoe of this type, one in which the sliding section is fixed to the base section by caulking may be used.

In order for the sliding section to be fixed to the base section by caulking, however, the sliding section needs to be machined to a predetermined shape enabling the caulking, before being attached to the base section. This increases the production cost of the sliding component due to the expense required for machining the sliding section. On the other hand, a piston shoe in which the sliding section is fixed to the base section by pressing the sliding section against the base section so that the sliding section is deformed and thus engaged with the base section has been proposed (see, for example, Japanese Patent Application Laid-Open No. H10-89241 (Patent Literature 1)).

CITATION LIST

Patent Literature

Patent Literature 1: Japanese Patent Application Laid-Open No. H10-89241

SUMMARY OF INVENTION

Technical Problem

With the structure of the piston shoe described in the Patent Literature 1 above, however, the sliding section is merely fixed to the base section by engagement. If the piston shoe receives an impact, for example, the fixed state of the sliding section to the base section may become unstable.

The present invention has been accomplished to solve the above-described problem, and an object of the present invention is to provide a sliding component having the sliding section stably fixed to the base section.

Solution to Problem

A sliding component according to the present invention is a sliding component that has a sliding surface. The sliding component includes a base section made of steel or cast iron, and a sliding section having the sliding surface, made of copper alloy, and joined to the base section. The base section and the sliding section are joined, with a base section joint region being formed in the base section, the base section joint region having smaller grains than other regions in the base section and including a base section joint surface that is a surface joined to the sliding section.

In the sliding component of the present invention, the base section and the sliding section are joined while the base section joint region including the base section joint surface and having smaller grains than other regions in the base section is formed. That is, the sliding component of the present invention has a structure in which the sliding section is joined with the base section joint region which is excellent in toughness because of the small grains therein. As a result, even when the sliding component receives an impact, for example, the sliding section is stably fixed to the base section. Therefore, according to the sliding component of the present invention, it is possible to provide the sliding component having the sliding section stably fixed to the base section.

In the above-described sliding component, the base section joint region may have a thickness, in a direction perpendicular to the base section joint surface, that is greater in a region including a surface of the sliding component than in the inside of the sliding component. This ensures that, in the vicinity of the joint surface, high toughness is more reliably imparted to the surface region of the base section from which cracking may start.

In the above-described sliding component, a sliding section joint region may be formed in the sliding section, the sliding section joint region having a lower hardness than other regions in the sliding section and including a sliding section joint surface that is a surface joined to the base section. This can relieve the strain in the joint portion between the sliding section and the base section.

In the above-described sliding component, the sliding section joint region may have a thickness of 0.2 mm or less in a direction perpendicular to the sliding section joint surface. By making the sliding section joint region no thicker than necessary, it is possible to impart sufficient strength to the sliding section.

In the above-described sliding component, the copper alloy may be high-strength brass. The high-strength brass is a material which has high strength and excellent sliding characteristics, and is suitable as the material constituting the sliding section.

In the above-described sliding component, the high-strength brass constituting the sliding section may include precipitates having a higher hardness than a matrix, and the precipitates in the sliding section joint region may be smaller in size than the precipitates in other regions in the sliding section. This can improve the toughness of the sliding section in the vicinity of the joint portion.

In the above-described sliding component, a precipitate aggregate as an aggregate of the precipitates may be formed in a region, within the sliding section joint region, that is in contact with the sliding section joint surface. The aggregate of fine precipitates formed in the vicinity of the sliding section joint surface can improve the strength in the vicinity of the sliding section joint surface, without significantly decreasing toughness.

In the above-described sliding component, the sliding section joint region may have a higher volume fraction of $\alpha$ phase than other regions in the sliding section. This can improve the toughness of the sliding section in the vicinity of the joint portion.

A method for producing a sliding component according to the present invention includes the steps of: preparing a base member made of steel or cast iron and a sliding member made of copper alloy; heating a region, within the base member, including a base member contact surface that is a surface of the base member coming into contact with the sliding member to a temperature not lower than the $A_1$ transformation point by causing the base member brought into contact with the sliding member to slide relatively to the sliding member to generate frictional heat; and joining the base member and the sliding member by letting the region including the base member contact surface cooled to a temperature lower than the $A_1$ transformation point in the state where the heated base member is held in contact with the sliding member.

In the method for producing a sliding component of the present invention, the base member is brought into contact with the sliding member and caused to slide relatively to the sliding member to generate frictional heat, thereby heating the region including the base member contact surface to a temperature not lower than the $A_1$ transformation point. Thereafter, the base member and the sliding member are cooled while being held in contact with each other, whereby the base member and the sliding member are joined, with the grains being made finer in the region including the base member contact surface. With this configuration, it is readily possible to produce the inventive sliding component described above having the sliding section stably fixed to the base section.

In the above-described method for producing a sliding component, in the step of heating the region including the base member contact surface to a temperature not lower than the $A_1$ transformation point, the base member may rotate relatively to the sliding member while being pressed against the sliding member, without changing its position relative to the sliding member.

With this configuration, the frictional heat can be generated without changing the positional relationship between the sliding member and the base member. This facilitates joining of the sliding member and the base member in a desired positional relationship.

In the above-described method for producing a sliding component, in the step of heating the region including the base member contact surface to a temperature not lower than the $A_1$ transformation point and in the step of joining the base member and the sliding member, the sliding member may be restrained on an outer peripheral side of a sliding member contact surface that is a surface of the sliding member coming into contact with the base member.

With this configuration, the deformation amount of the softened sliding member is restricted. As a result, the work amount in the machining work after the joining is reduced, leading to an improved yield of the material of the sliding member. Even in the case where the sliding member is small in thickness, the plastically deformed region in the sliding member is prevented from being exposed to the sliding surface of the sliding component, ensuring stable sliding characteristics of the sliding component.

In the above-described method for producing a sliding component, the copper alloy may be high-strength brass. The high-strength brass is a material having high strength and excellent sliding characteristics, and is thus suitable as a material constituting the sliding member.

The above-described method for producing a sliding component may further include the step of forming, in a region, within the sliding member, that is in contact with the sliding member contact surface, a region having a higher volume fraction of α phase than other regions in the sliding member by heating the sliding member in the state where the base member and the sliding member are joined. This can improve the toughness in the vicinity of the joint portion.

A device for producing a sliding component according to the present invention is a device for producing a sliding component by joining a base member made of steel or cast iron and a sliding member made of copper alloy. This device for producing a sliding component includes: a spindle that is rotatable about an axis; a base portion that is arranged spaced apart from the spindle in the axial direction; and a spacing adjusting portion that adjusts a spacing between the spindle and the base portion. The spindle includes a first holding portion that holds one of the base member and the sliding member so as to face the base portion. The base portion includes a second holding portion that holds the other of the base member and the sliding member so as to face the first holding portion. The first holding member and the second holding member are arranged such that, in the state where the base member and the sliding member are brought into contact with each other with the spacing between the spindle and the base portion adjusted by the spacing adjusting portion, the first or second holding portion that holds the sliding member surrounds an outer periphery of a sliding member contact surface that is a surface of the sliding member coming into contact with the base member.

The sliding component of the present invention can readily be produced by using the device for producing a sliding component of the present invention to carry out the above-described method for producing a sliding component. More specifically, while the spindle is caused to rotate about the axis in the state where the base member and the sliding member are held by one and the other of the first and second holding portions, the base member is pressed against the sliding member with the spacing between the spindle and the base portion adjusted by the spacing adjusting portion, to thereby heat the base member and the sliding member. The base member and the sliding member are then cooled in the state where they are in contact with each other, whereby the base member and the sliding member are joined.

Here, in the device for producing a sliding component of the present invention, the outer periphery of the sliding member contact surface is surrounded by the first or second holding portion in the state where the base member and the sliding member are in contact with each other. Therefore, upon joining of the base member and the sliding member, the softened sliding member is restrained on the outer peripheral side. As a result, the deformation amount of the softened sliding member is restricted, and the work amount in the machining work after the joining is reduced, leading to an improved yield of the material of the sliding member. Even in the case where the sliding member is small in thickness, the plastically deformed region in the sliding member is prevented from being exposed to the sliding surface of the sliding component, ensuring stable sliding characteristics of the sliding component. As such, according to the device for producing a sliding component of the present invention, it is possible to produce the sliding component of the present invention while improving the yield of the material of the sliding member and stabilizing the sliding characteristics of the sliding component.

In the above-described method for producing a sliding component, at least one of the spindle and the base portion may be provided with a load sensor that detects a contact load between the base member and the sliding member. This facilitates adjustment of the contact load between the base member and the sliding member to an appropriate range.

Effects of the Invention

As is clear from the above description, according to the sliding component and the method for producing a sliding component of the present invention, it is possible to provide the sliding component having the sliding section stably fixed to the base section. Further, according to the device for producing a sliding component of the present invention, it is readily possible to produce the sliding component of the present invention.

BRIEF DESCRIPTION OF DRAWINGS

FIG. 9 are optical micrographs showing, in enlarged view, the regions A-1 to A-4, B-1 to B-4, C-1 to C-4, and D-1 to D-4 in FIG. 8;

DESCRIPTION OF EMBODIMENTS

Figure 1:
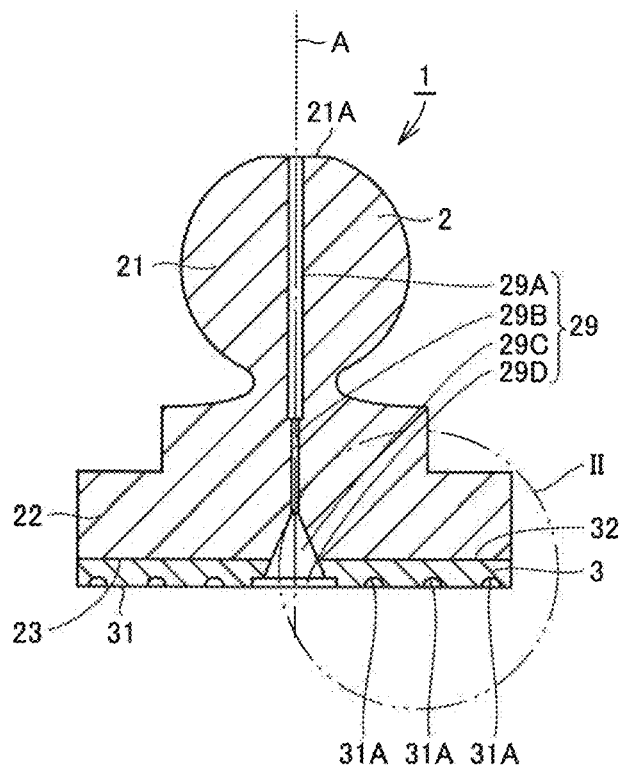
FIG. 1 is a schematic cross-sectional view showing the structure of a piston shoe.

An embodiment of the present invention will now be described. In the following drawings, the same or corresponding parts are denoted by the same reference numerals, and the description thereof will not be repeated.

FIG. 1 is a schematic cross-sectional view showing the structure of a piston shoe as a sliding component according to an embodiment of the present invention. Referring to FIG. 1, the piston shoe 1 is a component which is connected to a piston body (not shown) of a hydraulic pump or a hydraulic motor and slides with respect to a swash plate. The piston shoe 1 includes a base section 2, which is made of steel, and a sliding section 3 having a sliding surface 31, which is made of copper alloy and joined to the base section 2. For the steel constituting the base section 2, for example, alloy steel for machine structural use (such as JIS SCM440) or carbon steel for machine structural use that has undergone thermal refining, or, quenching and tempering can be adopted. The base section 2 includes a spherical portion 21 of a spherical shape, which is to be swingably connected to the piston body, and a disk portion 22 of a stepped disk shape, which is connected to the spherical portion 21.

The spherical portion 21 is swingably held by a holding portion (not shown) having a spherical inner wall, formed in the piston body. At an end of the spherical portion 21 opposite to the side connected to the disk portion 22, a planar flat part 21A is formed. At an end of the disk portion 22 opposite to the spherical portion 21 side, a planar base section joint surface 23 is formed.

The base section joint surface 23 is joined with the sliding section 3, which is of a disk shape and smaller in thickness than the disk portion 22. The sliding section 3 is joined, at one main surface constituting a sliding section joint surface 32, to the base section joint surface 23 of the disk portion 22. The other main surface of the sliding section 3 constitutes the sliding surface 31. This sliding surface 31 slides with respect to a swash plate (not shown) of a hydraulic pump, for example. The sliding section 3, made of copper alloy having excellent sliding characteristics, restricts the frictional force between the swash plate and the piston shoe 1. For the copper alloy constituting the sliding section 3, brass such as high-strength brass, as well as bronze such as aluminum bronze, can be adopted. In the present embodiment, the sliding section 3 is made of high-strength brass. Further, the sliding surface 31 has a plurality of annular grooves 31A formed concentrically. These grooves 31A hold a proper amount of oil, thereby further restricting the frictional force between the swash plate and the piston shoe 1.

The piston shoe 1 has a shape which is symmetrical about the central axis A. The piston shoe 1 has a linear center hole 29 which is formed in the region including the central axis A to penetrate through the piston shoe 1 from the flat part 21A of the spherical portion 21 to the sliding surface 31 of the sliding section 3. The center hole 29 includes a first region 29A, a second region 29B, a third region 29C, and a fourth region 29D. The first region 29A extends from the flat part 21A in the direction of the sliding surface 31. The second region 29B is connected to the first region 29A, and has a cross section perpendicular to the longitudinal direction (along the axis A) smaller in area than that of the first region 29A. The third region 29C is connected to the second region 29B, and has a cross section perpendicular to the axial direction increasing in area as it approaches the sliding surface 31. The fourth region is connected to the third region 29C, and has a cross section perpendicular to the axial direction larger in area than that of the third region 29C.

Figure 2:
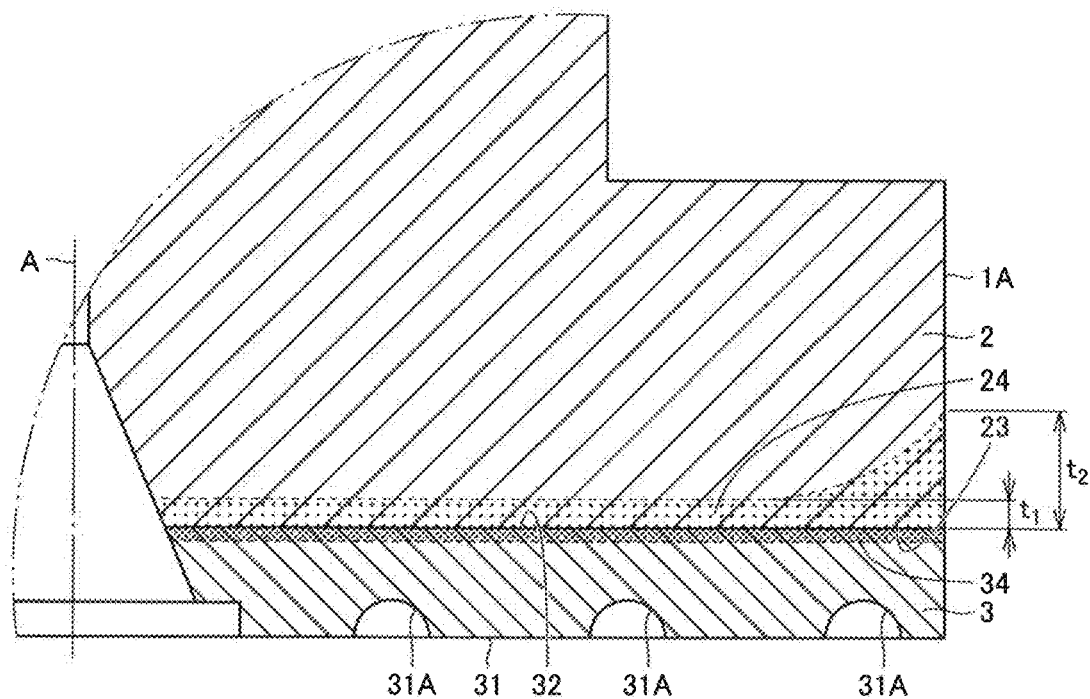
FIG. 2 is a schematic cross-sectional view showing, in enlarged view, the region II in FIG. 1.

The structure near the joint portion between the base section 2 and the sliding section 3 will now be described. FIG. 2 is an enlarged schematic cross-sectional view of the region II in FIG. 1. Referring to FIG. 2, the base section 2 is directly joined to the sliding section 3, with a base section joint region 24 being formed in the base section 2, the base section joint region 24 including the base section joint surface 23 and having smaller grains than other regions in the base section 2.

In the piston shoe 1 of the present embodiment, the sliding section 3 is directly joined to the base section 2 in which base section joint region 24 having smaller grains than other regions in the base section 2 has been formed. That is, the piston shoe 1 has a structure in which the base section joint region 24 excellent in toughness due to the small grains therein and the sliding section 3 are joined directly. Thus, the sliding section 3 is stably fixed to the base section 2. As such, the piston shoe 1 is a sliding component having the sliding section 3 stably fixed to the base section 2.

Here, referring to FIG. 2, the thickness $t_2$ of the base section joint region 24 in the region including a surface 1A of the piston shoe 1 may be greater than the thickness $t_1$ of the base section joint region 24 in the inside. This ensures that, in the vicinity of the joint surface, high toughness is more reliably imparted to the surface region of the base section 2 from which cracking may start. In the present embodiment, the base section joint region 24 has its thickness increasing gradually as it approaches the surface 1A of the piston shoe 1.

Further, in the sliding section 3, a sliding section joint region 34 having a lower hardness than other regions in the sliding section 3 may be formed to include the sliding section joint surface 32, which is the surface joined to the base section 2. This can relieve the strain in the joint portion between the sliding section 3 and the base section 2.

It is preferable that the sliding section joint region 34 has a thickness of 0.2 mm or less in the direction perpendicular to the sliding section joint surface 32. By making the sliding section joint region 34 no thicker than necessary, it is possible to impart sufficient strength to the sliding section 3.

Further, the high-strength brass constituting the sliding section 3 may include precipitates having a higher hardness than the matrix, and the precipitates in the sliding section joint region 34 may be smaller in size than the precipitates in other regions in the sliding section 3. This can improve the toughness of the sliding section in the vicinity of the joint portion.

Further, a precipitate aggregate as an aggregate of the precipitates may be formed in a region, within the sliding section joint region 34, that is in contact with the sliding section joint surface 32. The aggregate of fine precipitates formed in the vicinity of the sliding section joint surface 32 can improve the strength in the vicinity of the sliding section joint surface 32, without significantly decreasing toughness.

Furthermore, the sliding section joint region 34 may have a higher volume fraction of α phase than other regions. This can improve the toughness of the sliding section 3 in the vicinity of the joint portion.

Figure 3:
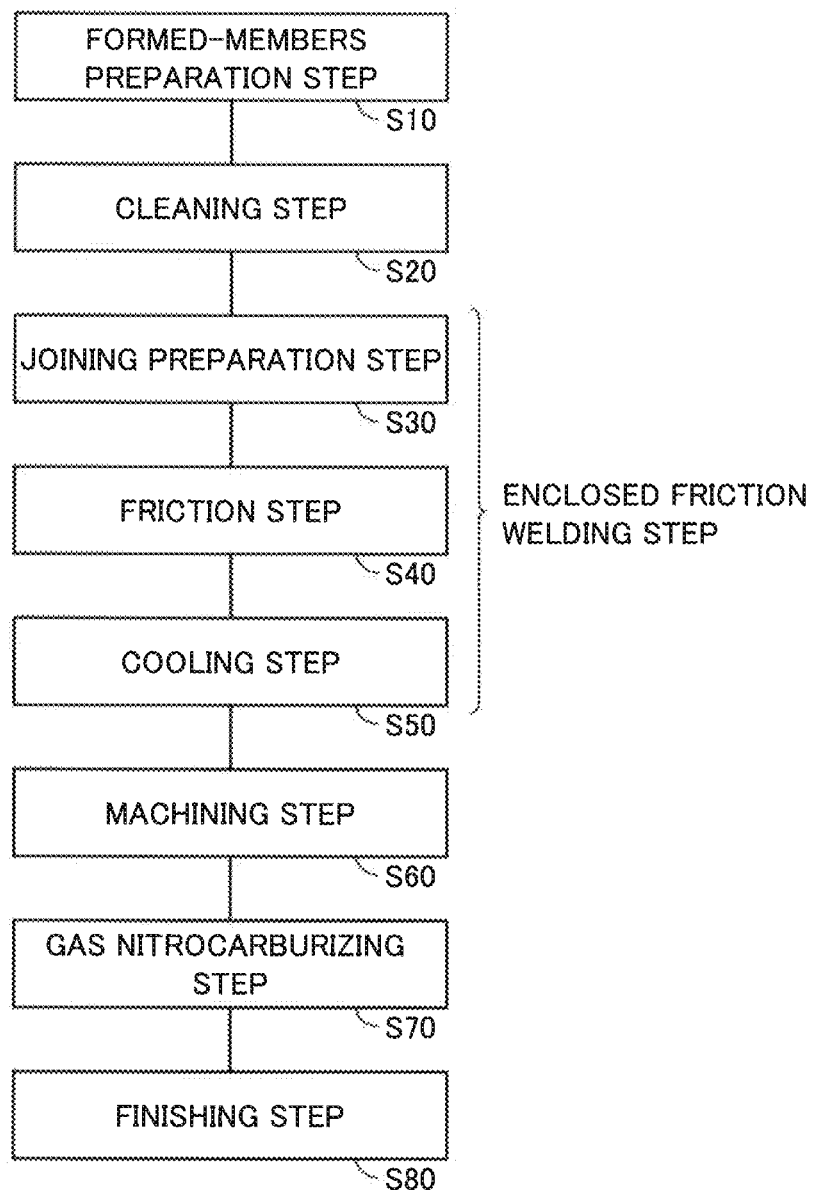
FIG. 3 is a flowchart schematically illustrating a method for producing a piston shoe.
Figure 4:
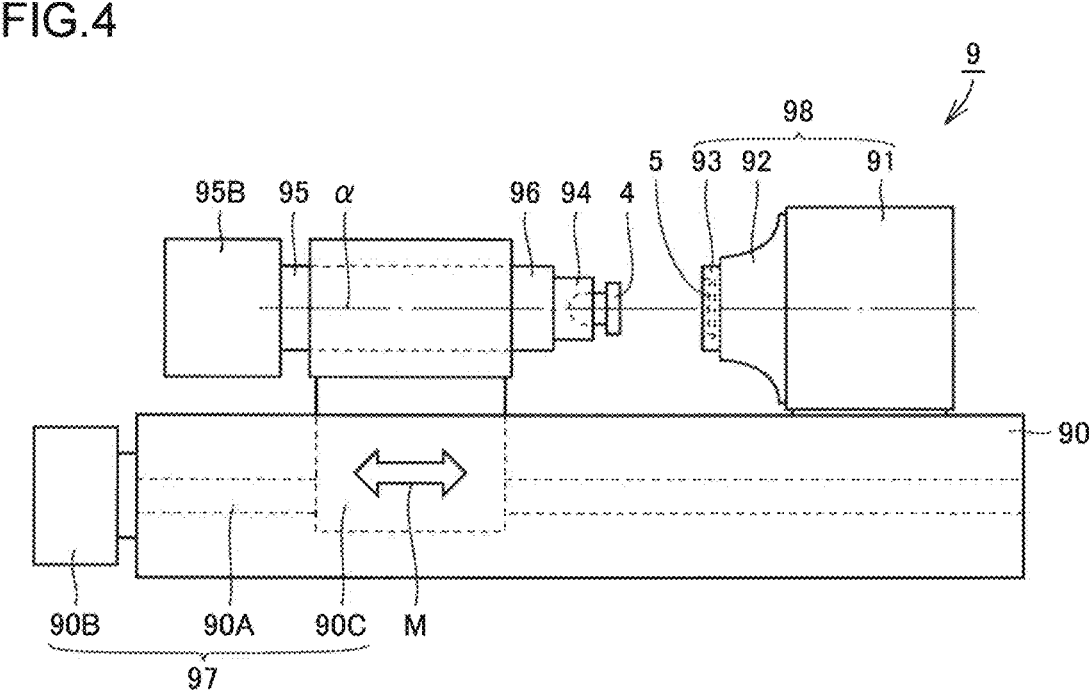
FIG. 4 is a schematic diagram showing the structure of a device for producing a piston shoe.
Figure 5:
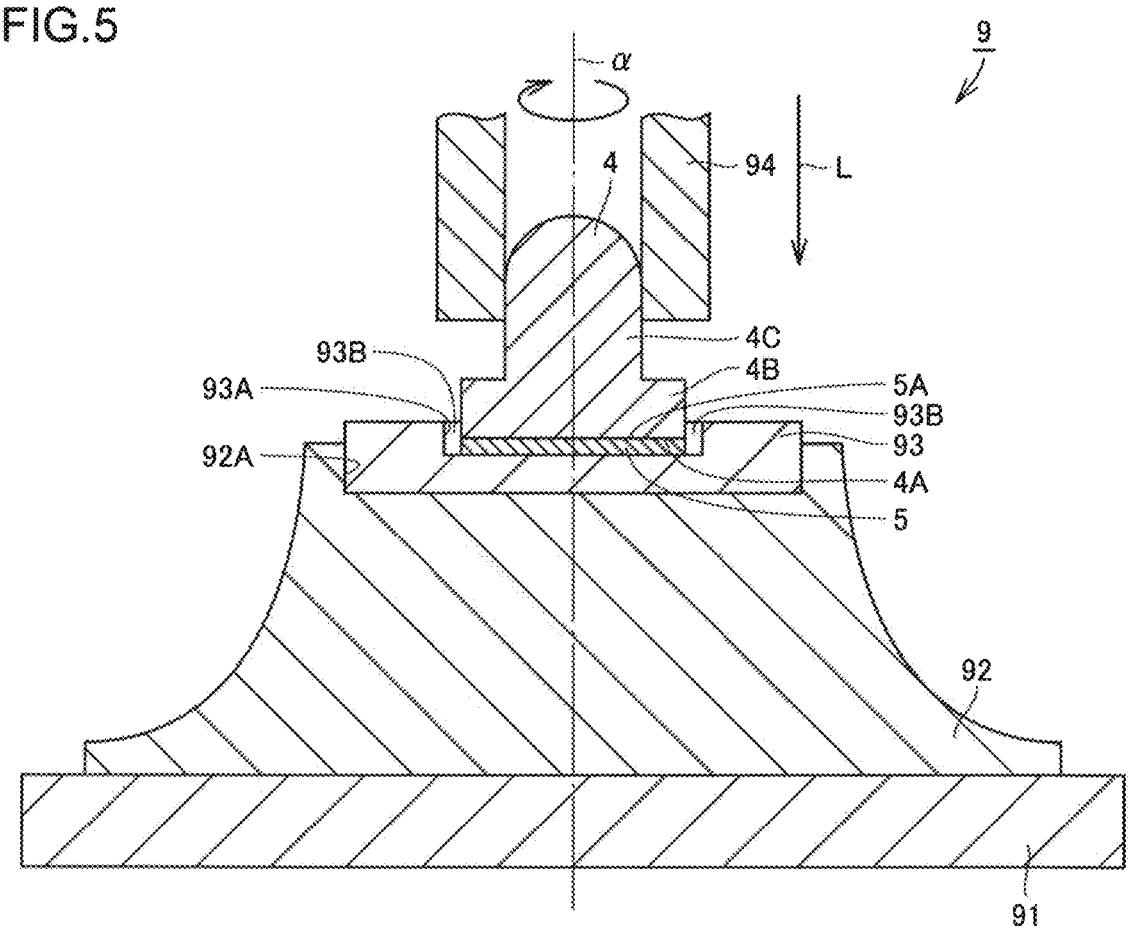
FIG. 5 is a schematic cross-sectional view showing the operation of the device for producing a piston shoe.
Figure 6:
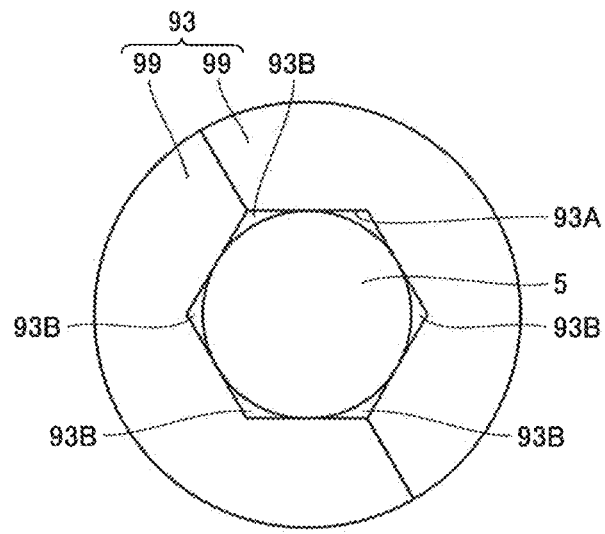
FIG. 6 is a schematic plan view showing the structure of a restraint jig.

A method for producing the above-described piston shoe 1 will now be described. FIG. 3 is a flowchart schematically illustrating the method for producing a piston shoe. FIG. 4 is a schematic diagram showing the structure of a device for producing a piston shoe. FIG. 5 is a schematic cross-sectional view showing the operation of the device for producing a piston shoe. FIG. 6 is a schematic plan view showing the structure of a restraint jig included in the device for producing a piston shoe.

Referring to FIG. 3, in the method for producing the piston shoe 1 in the present embodiment, first, a formed-members preparation step is carried out as a step S10. In this step S10, referring to FIG. 5, a base member 4, made of thermally refined alloy steel for machine structural use, and a disk-shaped sliding member 5, made of high-strength brass, are prepared. The base member 4 includes a disk portion 4B of a disk shape, and a cylindrical portion 4C smaller in outer diameter than the disk portion, which is connected to the disk portion 4B. At an end of the disk portion 4B opposite to the cylindrical portion 4C side, a base member contact surface 4A is formed which is a flat surface to be joined to the sliding member 5. One main surface of the sliding member 5 constitutes a sliding member contact surface 5A which is a flat surface to be joined to the base member 4.

Next, a cleaning step is carried out as a step S20. In this step S20, the base member 4 and the sliding member 5 prepared in the step S10 are cleaned. More specifically, the base member 4 and the sliding member 5 are cleaned using methanol, ethanol, acetone, or other liquid. This removes any foreign matters attached to the base member 4 or the sliding member 5 during the cutting, machining, or other processes for preparing the base member 4 and the sliding member 5. In the method for producing the piston shoe 1 in the present embodiment, precision finish work on the sliding member contact surface 5A may be omitted; the sliding member contact surface 5A may be left as cut, for example.

Next, referring to FIG. 3, an enclosed friction welding step is carried out. This enclosed friction welding step includes a joining preparation step, a friction step, and a cooling step. Here, a device for producing a piston shoe (sliding component) which produces the piston shoe by conducting enclosed friction welding will be described.

Referring to FIG. 4, an enclosed friction welding device 9 as the device for producing a piston shoe includes: a spindle 95 which is rotatable about an axis α, a base portion 98 disposed spaced apart from the spindle 95 in the axis α direction, a spacing adjusting portion 97 which adjusts the spacing between the spindle 95 and the base portion 98, and a frame 90 which supports the spindle 95 and the base portion 98.

The spindle 95 is provided with a chuck 94 which is a first holding portion for holding the base member 4 to face the base portion 98. The spindle 95 is connected with a spindle motor 95B which rotatively drives the spindle 95 about the axis α. The spindle 95 is further provided with a load sensor 96 which detects a contact load between the base member 4 and the sliding member 5. The load sensor 96 detects the contact load between the base member 4 and the sliding member 5 from the magnitude of the contact reaction force between the base member 4 and the sliding member 5 that is applied to the chuck 94. The load sensor 96 is not an indispensable component of the enclosed friction welding device 9 but, when provided, facilitates adjustment of the contact load between the base member 4 and the sliding member 5 to an appropriate range.

The base portion 98 is provided with a restraint jig 93 which is a second holding portion for holding the sliding member 5 to face the chuck 94. More specifically, referring to FIGS. 4 and 5, the base portion 98 includes a base body 91, a jig holder 92, and the restraint jig 93. The base body 91 is disposed on the frame 90. The jig holder 92 is fixed onto the base body 91. The restraint jig 93 is fixedly fitted in a jig holding portion 92A which is a recessed portion formed in the jig holder 92. The restraint jig 93 can be separated into two parts 99, 99, as shown in FIG. 6. Further, the restraint jig 93 has a holding portion 93A which is a region where the sliding member 5 is held. In a planar view (as seen in the direction along the axis α), the holding portion 93A has a polygonal shape, specifically a hexagonal shape, which circumscribes the outer peripheral surface of the disk-shaped sliding member 5.

Referring to FIG. 4, inside the frame 90, a shaft 90A is disposed to extend in parallel with the axis α. This shaft 90A supports a spindle support portion 90C which supports the spindle 95, so as to allow the spindle support portion 90C to move in the direction in which the shaft 90A extends. A spindle moving motor 90B for driving the shaft 90A is connected to the shaft 90A. As the shaft 90A is driven by the spindle moving motor 90B, the spindle 95 supported by the spindle support portion 90C moves in the axis α direction. This enables adjustment of the spacing between the spindle 95 and the base portion 98. The shaft 90A, the spindle support portion 90C, and the spindle moving motor 90B constitute the spacing adjusting portion 97.

The chuck 94 and the restraint jig 93 are arranged such that, in the state (as shown in FIG. 5) where the base member 4 and the sliding member 5 are brought into contact with each other with the spacing between the spindle 95 and the base portion 98 adjusted by the spacing adjusting portion 97, the restraint jig 93 serving as the second holding portion surrounds the outer periphery of the sliding member contact surface 5A, which is the surface of the sliding member 5 coming into contact with the base member 4. Stated from another point of view, referring to FIG. 5, the holding portion 93A of the restraint jig 93 has a height in the axis α direction that is greater than the thickness of the sliding member 5.

Figure 7:
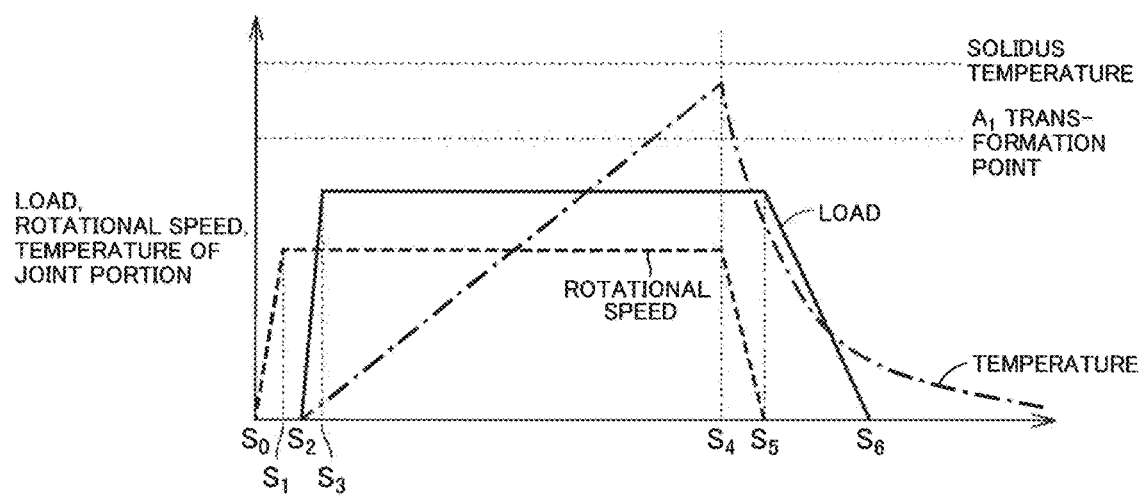
FIG. 7 shows changes over time of the rotational speed of a spindle, pressing load, and temperature of the joint portion during an enclosed friction welding step.

A specific procedure of the enclosed friction welding step will now be described. FIG. 7 shows changes over time of the rotational speed of the spindle 95, the contact load (pressing load) between the base member 4 and the sliding member 5, and the temperature of the joint portion between the base member 4 and the sliding member 5, during the enclosed friction welding step. Referring to FIGS. 4 and 5, in the joining preparation step carried out as a step S30, the base member 4 is held by the chuck 94 at the outer peripheral surface of the cylindrical portion 4C, and the sliding member 5 is set in the holding portion 93A of the restraint jig 93. At this time, the base member 4 and the sliding member 5 are arranged such that the base member contact surface 4A faces the sliding member contact surface 5A and that the central axes of the base member 4 and the sliding member 5 agree with the rotational axis α of the chuck 94.

Next, the friction step is carried out as a step S40. In this step S40, the spindle 95 is driven by the spindle motor 95B to rotate about the axis α, and it is also driven by the spindle moving motor 90B to approach the base portion 98. Consequently, the chuck 94 approaches the restraint jig 93 while rotating about the axis α. At this time, referring to FIG. 7, the rotational speed of the spindle 95, which started rotating at time $S_0$, reaches a desired rotational speed at time $S_1$, and is maintained at the desired rotational speed thereafter. Further, at time $S_2$, the base member contact surface 4A comes into contact with the sliding member contact surface 5A, as shown in FIG. 5. Thus, the base member 4 rotates with respect to the sliding member 5, while being pressed against the sliding member 5 with load L, without changing its position relative to the sliding member 5. As a result, as shown in FIG. 7, the temperature of the contact portion (joint portion) between the base member 4 and the sliding member 5 increases due to the heat of friction. Then, at time $S_3$, the pressing load (contact load between the base member contact surface 4A and the sliding member contact surface 5A) detected by the load sensor 96 reaches a desired level, and is maintained at the desired level thereafter. During this time, the temperature of the contact portion between the base member 4 and the sliding member 5 continues to increase.

Then, at time $S_4$, the temperature of the contact portion between the base member 4 and the sliding member 5 reaches a temperature that is not lower than the $A_1$ transformation point and lower than the solidus temperature. As a result, a region, within the base member 4, that includes the base member contact surface 4A is heated to a temperature not lower than the $A_1$ transformation point and lower than the solidus temperature, and the steel constituting that region attains the austenite state including no liquid phase.

On the other hand, the heated sliding member 5 softens and deforms to fill in gaps 93B between the sliding member 5 and the restraint jig 93 (see FIG. 6). As a result, even when the base member 4 rotates about the axis α, the sliding member 5 will not rotate in accordance therewith.

Next, the cooling step is carried out as a step S50. In this step S50, first, the rotational speed of the spindle 95 is lowered, and the rotation is stopped at time $S_5$. Thereafter, the pressing load detected by the load sensor 96 is decreased. During this time, the contact portion between the base member 4 and the sliding member 5 is cooled, with the base member 4 and the sliding member 5 being maintained in the state of pressing each other. Accordingly, the base member 4 and the sliding member 5 are joined. Then, at time $S_6$, the pressing load is set to zero, and the structural body configured with the base member 4 and the sliding member 5 joined to each other is taken out from the enclosed friction welding device 9.

Here, the region within the base member 4 including the base member contact surface 4A, which was heated to a temperature not lower than the $A_1$ transformation point in the step S40, is cooled to a temperature lower than the $A_1$ transformation point in the step S50. In such a region that was once heated to a temperature not lower than the $A_1$ transformation point and then cooled to a temperature lower than the $A_1$ transformation point, the grains become finer. As a result, the base section joint region 24 having smaller grains than the other regions is formed (see FIG. 2). The enclosed friction welding step is completed through the above-described procedure.

Next, a machining step is carried out as a step S60. In this step S60, the structural body obtained in the step S50 is subjected to machining. Specifically, referring to FIG. 1, the outer peripheral surface of the sliding member 5 is machined to form the disk-shaped sliding section 3. Further, the cylindrical portion of the base member 4 is machined to form the spherical portion 21. The center hole 29, the flat part 21A, and the grooves 31A are also formed in this step.

Next, a gas nitrocarburizing step is carried out as a step S70. In this step S70, referring to FIG. 1, the gas nitrocarburizing processing is carried out in the state where the spherical portion 21 formed in the step S60 is fitted in a holding portion (not shown) having a spherical inner wall, formed in a piston body prepared separately. Specifically, while being heated within an atmosphere including ammonia gas to a temperature lower than the $A_1$ transformation point, nitrided layers are formed in the surface portions of the base member 4 (base section 2) and the piston body (not shown). At this time, with the heating for the gas nitrocarburizing processing, a region having a higher volume fraction of α phase than other regions is formed in a region, within the sliding member 5, that is in contact with the sliding member contact surface 5A. Accordingly, referring to FIG. 2, the volume fraction of the α phase in the sliding section joint region 34 becomes higher than in the other regions.

Next, a finishing step is carried out as a step S80. In this step, the base member 4, the sliding member 5, and the piston body (not shown), which have undergone the gas nitrocarburizing processing in the step S70, are subjected to finishing processing as required. Through the above procedure, the piston shoe 1 in the present embodiment is completed in the state of being combined with the piston body.

As described above, according to the method for producing a piston shoe in the present embodiment, the piston shoe 1 of the present embodiment described above can be produced. Here, the friction step performed as the step S40 can be carried out for example by causing the base member 4 to reciprocate relatively to the sliding member 5. However, causing the base member 4 to rotate without changing its position relative to the sliding member 5 facilitates joining of the sliding member 5 and the base member 4 in a desired positional relationship.

Further, referring to FIG. 6, as the base member 4 rotates, in the step S40, without changing its position relative to the sliding member, the circumferential velocity of the base member 4 with respect to the sliding member 5 increases with increasing distance from the axis α. Therefore, the heat produced by friction increases on the outer peripheral side of the base member 4. As a result, the region within the base member 4 where the temperature exceeds the $A_1$ transformation point due to the frictional heat becomes larger in thickness on the outer peripheral side of the base member 4. Accordingly, referring to FIG. 2, the base section joint region 24 in which the grains are smaller than in the other regions can be made thicker on the outer peripheral side, i.e. in the region including the surface 1A of the piston shoe 1, than in the inside. Further, referring to FIG. 6, the cylindrical portion 4C of the base member 4 in the present embodiment described above has an outer diameter smaller than that of the disk portion 4B. This makes it difficult for the frictional heat produced in the outer peripheral portion of the base member contact surface 4A to be transmitted to the cylindrical portion 4C. As a result, the region within the base member 4 where the temperature exceeds the $A_1$ transformation point due to the frictional heat becomes still larger in thickness on the outer peripheral side of the base member 4. Therefore, according to the method for producing the piston shoe 1 in the present embodiment, it is readily possible to increase the thickness of the base section joint region 24 on the outer peripheral side, i.e. in the region including the surface 1A of the piston shoe 1, than in the inside.

Further, in the method for producing the piston shoe 1 in the present embodiment, referring to FIG. 5, the height of the holding portion 93A in the axis α, direction is greater than the thickness of the sliding member 5. As a result, in the steps S40 and S50, the state where the sliding member 5 is restrained on the outer peripheral side of the sliding member contact surface 5A is maintained. This can restrict the deformation amount of the softened sliding member 5. More specifically, in the piston shoe 1 produced, the sliding section joint region 34 formed by deformation of the sliding member 5 can be made to have the thickness of 0.2 mm or less in the direction perpendicular to the sliding section joint surface 32. As a result, the work amount in the machining work after the joining is reduced, leading to an improved yield of the material of the sliding member 5. Even in the case where the sliding member 5 is small in thickness, the plastically deformed region in the sliding member 5 is prevented from being exposed to the sliding surface 31 of the piston shoe 1, ensuring stable sliding characteristics of the sliding section 3. Further, the sliding section joint region 34 having a low hardness is made no thicker than it needs to be, whereby sufficient strength can be imparted to the sliding section 3.

Here, referring to FIG. 6, the softened sliding member 5 deforms to fill in the gaps 93B between the sliding member 5 and the restraint jig 93. This means that adjusting the gaps 93B to an appropriate size can restrict the deformation amount of the sliding member 5.

While the case where the base member moves (rotates) while the sliding member is fixed has been described in the above embodiment, the method for producing a sliding component in the present invention is not limited thereto; the sliding member may move (rotate) while the base member is fixed, or both members may move (rotate) so that one slides relatively to the other.

Further, in the above embodiment, the enclosed friction welding device 9 (device for producing the sliding component) was explained as the structure in which the spindle is movable in the axial direction. The device for producing a sliding component in the present invention, however, is not limited thereto; the base portion may be movable in the axial direction.

Furthermore, in the above embodiment, the case where the holding portion 93A of the restraint jig 93 is of a hexagonal shape in a planar view (as seen in the direction along the axis α) was explained. The restraint jig adoptable, however, is not limited thereto; the holding portion may be of another polygonal shape (for example, octagonal shape), or it may be of a circular shape having a diameter slightly larger than that of the sliding member 5.

In the above embodiment, the piston shoe was explained as an example of the sliding component. The sliding component of the present invention, however, is not limited thereto; the present invention is applicable to a variety of sliding components configured with a base section made of steel or cast iron and a sliding section made of copper alloy joined together. Further, while the base member (base section) was made of steel in the above embodiment, the base member (base section) may be made of cast iron.

EXAMPLES

Example 1

A base member and a sliding member having shapes similar to those of the above embodiment were prepared (see FIG. 5), and the procedure in the above embodiment except for combining with a piston body was carried out to create a test piece (piston shoe) having the base member and the sliding member joined by enclosed friction welding. The test piece was then subjected to experiments for measuring the structure and hardness thereof. The results of the experiments are as follows.

Figure 8:
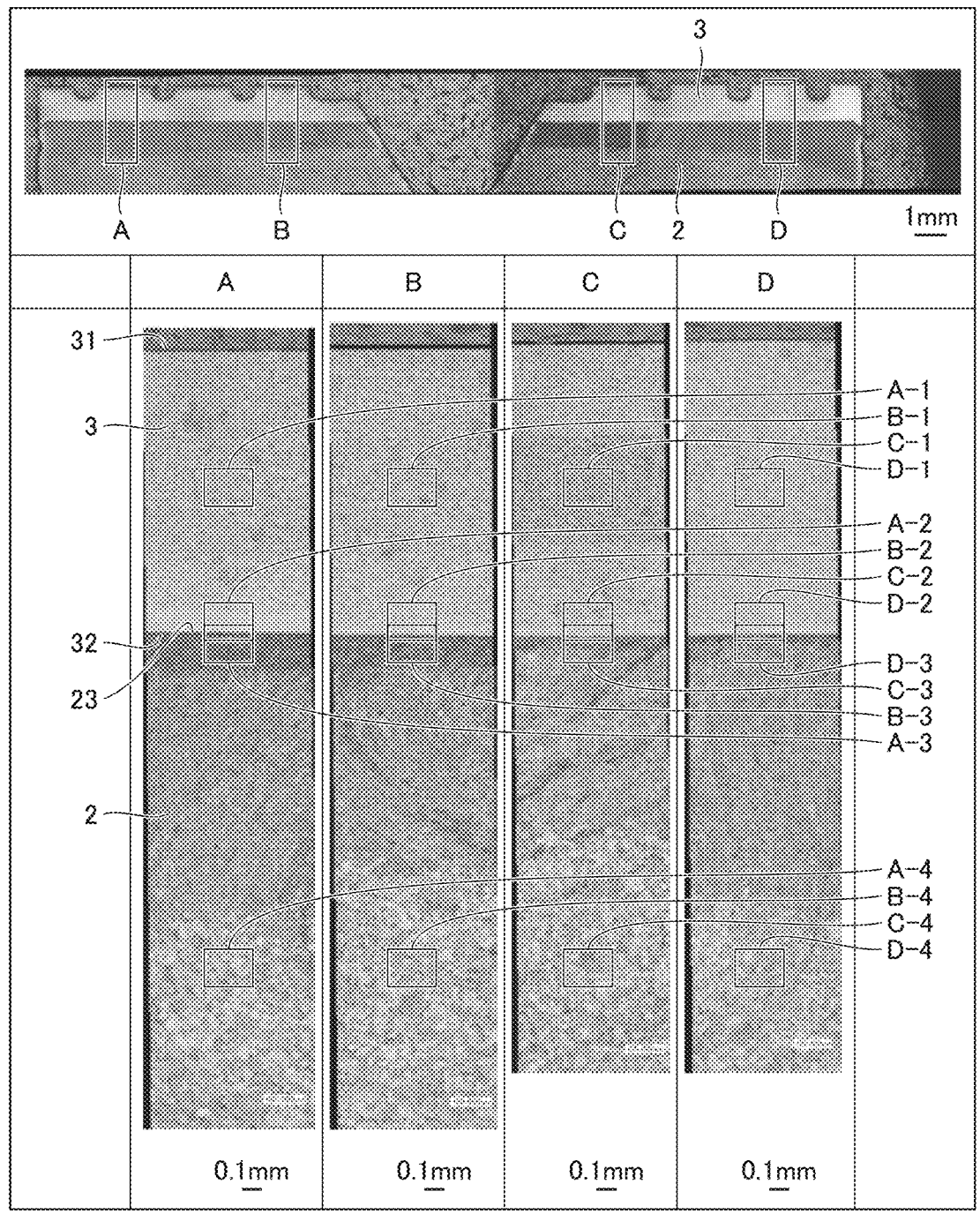
FIG. 8 are photographs showing the metallic structure near the joint portion between high-strength brass and steel.
Figure 9:
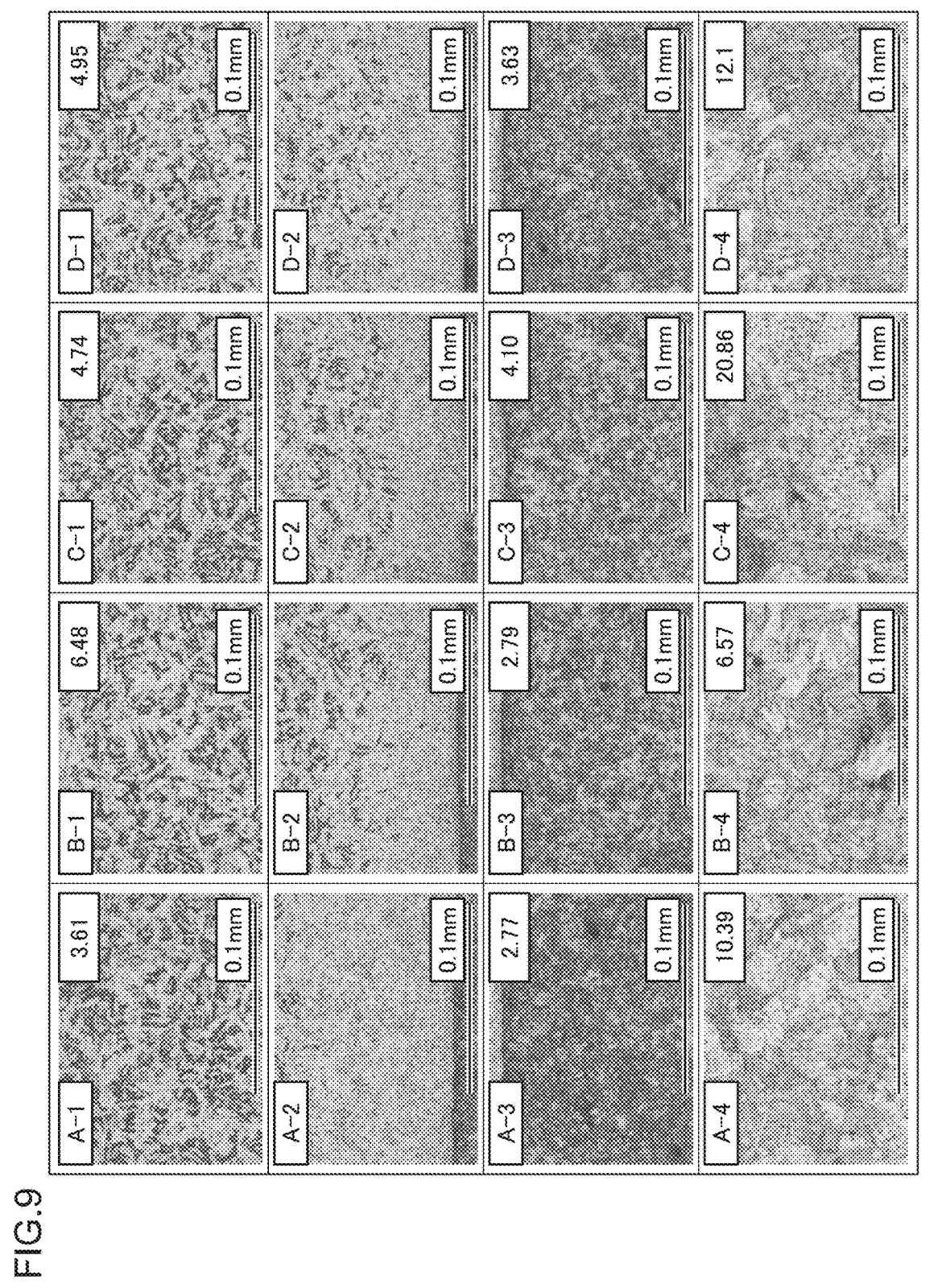

FIG. 8 are photographs showing the metallic structure near the joint portion between the base section 2 (steel) and the sliding section 3 (high-strength brass). More specifically, FIG. 8 shows the state where the obtained test piece was cut in a cross section perpendicular to the joint surface and etched with a ferric chloride solution. FIG. 9 are optical micrographs showing, in enlarged view, the regions A-1 to A-4, B-1 to B-4, C-1 to C-4, and D-1 to D-4 in FIG. 8. The numerical value at the upper right of each micrograph in FIG. 9 indicates the grain size (in μm) in that micrograph.

Referring to FIG. 8, it is confirmed that the base section 2 and the sliding section 3 have been joined favorably over the whole area. Further, there is a deeply etched region, shown in dark color, in the base section 2 along the joint interface.

Referring to FIG. 9, the grain size in each of the regions A-3, B-3, C-3, and D-3 corresponding to the dark-colored region is smaller than the grain size in each of the regions A-4, B-4, C-4, and D-4 corresponding to the region other than the dark-colored region.

From this, it is confirmed that in the piston shoe produced in a similar manner as in the above embodiment, a base section joint region is formed in the base section, which includes the base section joint surface and has smaller grains than other regions in the base section. Further, it is confirmed that the thickness of the base section joint region (dark-colored region) in the direction perpendicular to the joint surface becomes greater in the region including the surface than in the inside of the piston shoe which is the sliding component (see the photograph in the upper part of FIG. 8).

Figure 10:
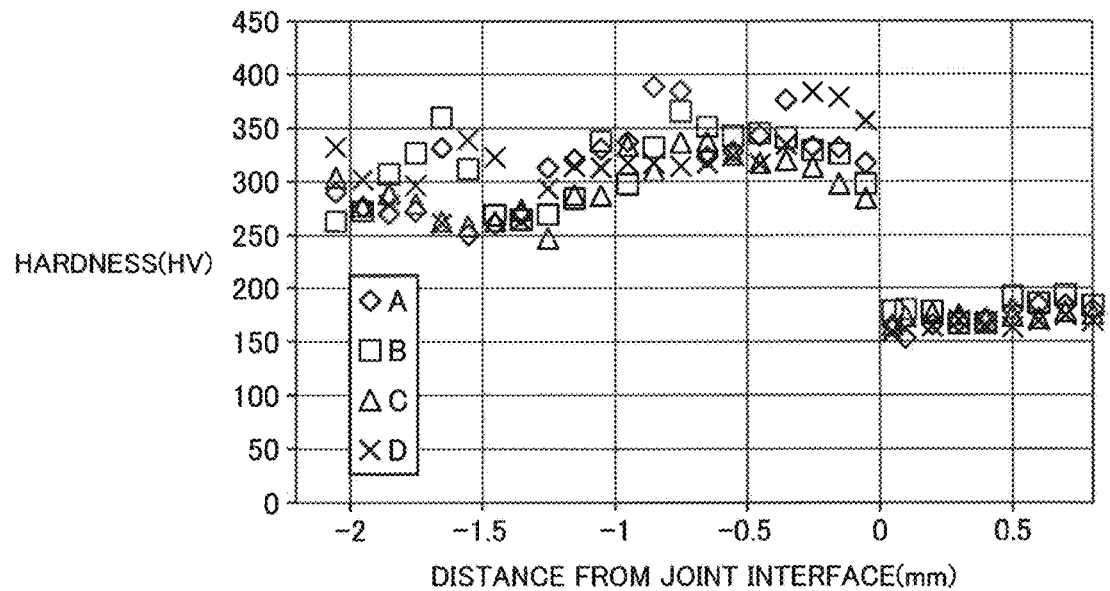
FIG. 10 shows hardness distribution within a test piece.

The hardness of each of the regions A, B, C, and D in FIG. 8 was measured in the direction perpendicular to the joint interface. The measurement results are shown in FIG. 10. In FIG. 10, the horizontal axis represents distance from the joint interface. The point where the value on the horizontal axis is zero corresponds to the joint interface. In FIG. 10, the region where the value on the horizontal axis is negative corresponds to the base section 2 (steel), and the region where the value is positive corresponds to the sliding section 3 (high-strength brass). Referring to FIG. 10, the hardness is discontinuous at the joint interface as the boundary. From this, it is confirmed that the steel constituting the base section 2 and the high-strength brass constituting the sliding section 3 have been directly joined favorably, without the intermediary of any other substance.

Figure 11:
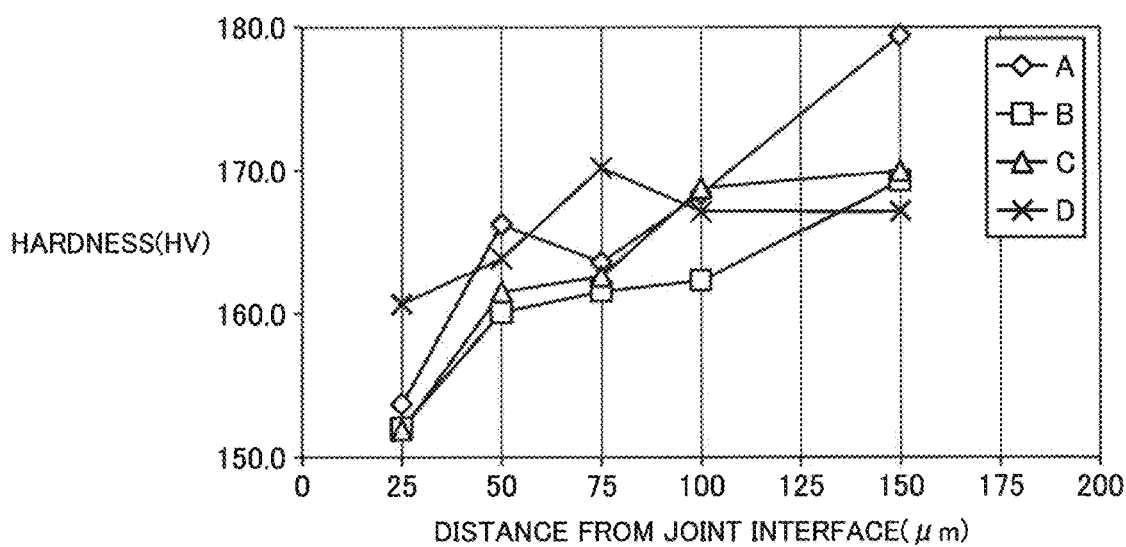
FIG. 11 shows hardness distribution in copper alloy in the vicinity of the joint surface.

FIG. 11 shows hardness distribution in the sliding section 3 in the vicinity of the joint interface. Referring to FIG. 11, in the region where the distance from the joint interface is 100 μm or less, the hardness decreases as the distance from the joint interface decreases. That is, it is confirmed from the measurement results in FIG. 11 that in the sliding section, a sliding section joint region has been formed which includes the sliding section joint surface and has a lower hardness than other regions in the sliding section. The correspondence between the sliding section joint region, which is the low-hardness region, and the metallic structure will be described below.

Figure 12:
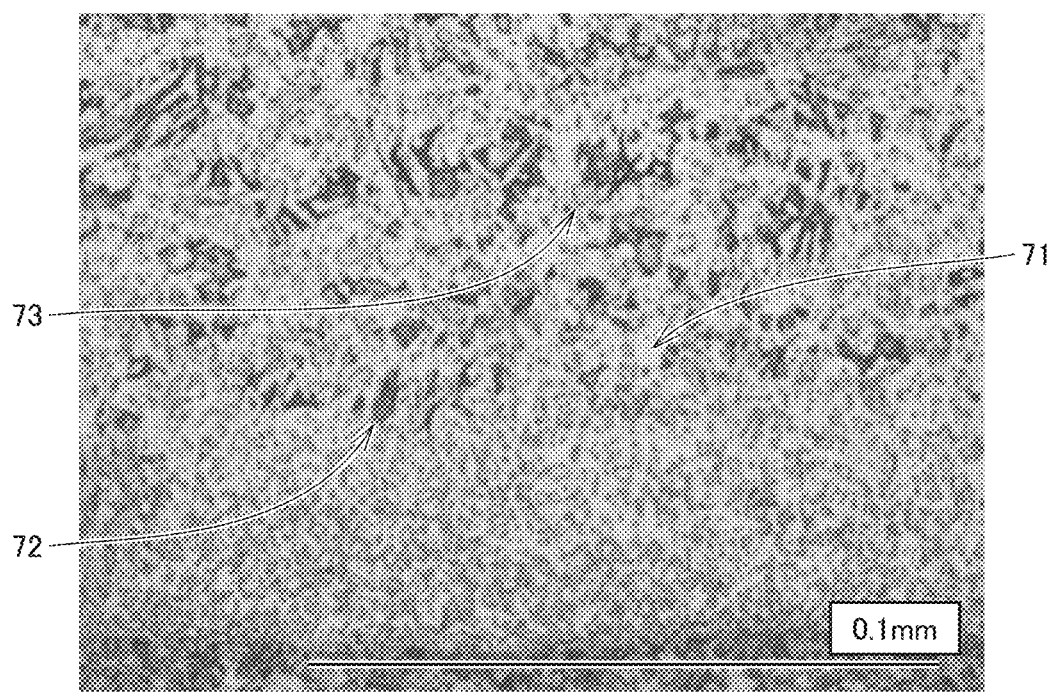
FIG. 12 is an optical micrograph illustrating the structure of copper alloy.
Figure 13:
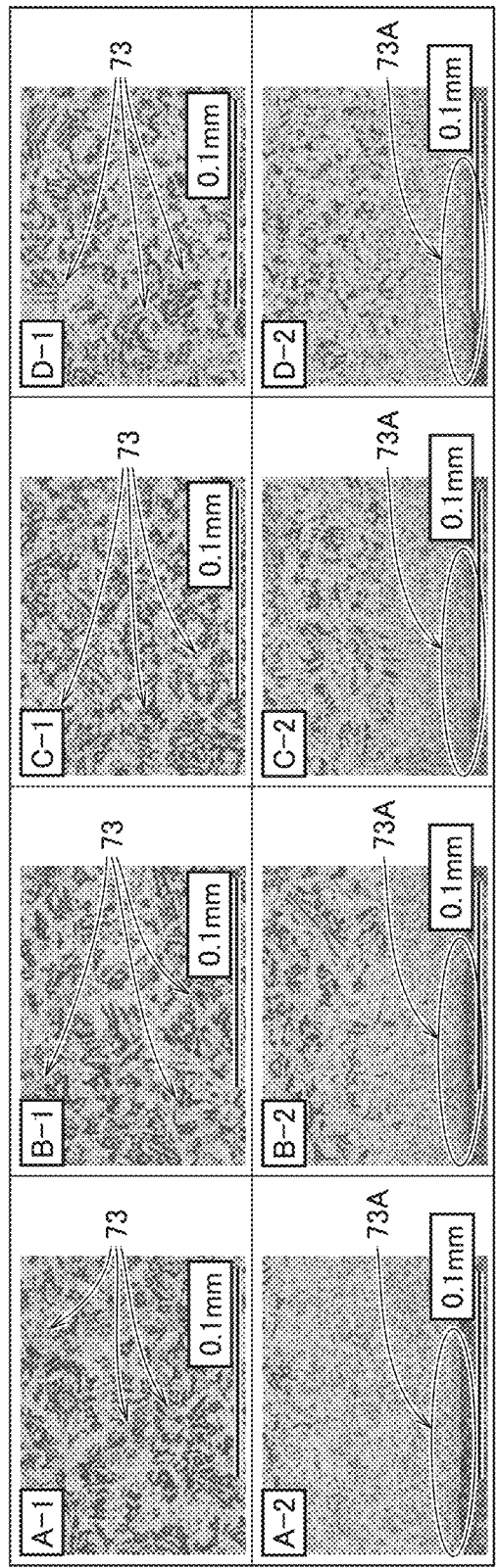
FIG. 13 are optical micrographs showing, in enlarged view, the regions A-1, A-2, B-1, B-2, C-1, C-2, D-1, and D-2 in FIG. 8.

FIG. 12 is an optical micrograph illustrating the structure of the copper alloy. FIG. 13 are optical micrographs showing the metallic structure in the regions A-1, A-2, B-1, B-2, C-1, C-2, D-1, and D-2 in FIG. 8, or, the metallic structure of the high-strength brass constituting the sliding section. Referring to FIG. 12, the high-strength brass constituting the sliding section includes α phase 71 and β phase 72 constituting a matrix, and precipitates 73 having a higher hardness than the matrix. Referring to FIG. 13, it is seen that the precipitates in the sliding section joint region (in the vicinity of the joint interface in A-2, B-2, C-2, and D-2) are smaller in size than the precipitates in other regions (for example, in A-1, B-1, C-1, and D-1) in the sliding section. That is, the sliding section joint region which is a low-hardness region corresponds to the region in which the size of the precipitates is small. Further, as apparent from FIG. 13, the thickness of the sliding section joint region is 0.2 mm or less.

Further, referring to FIG. 13, it is confirmed that a precipitate aggregate 73A as an aggregate of precipitates has been formed in the region, within the sliding section joint region, that is in contact with the sliding section joint surface. Referring also to FIG. 13, it is confirmed that there is almost no β phase in the sliding section joint region (in the vicinity of the joint interface in A-2, B-2, C-2, and D-2) and that the volume fraction of the α phase in that region is higher than in other regions. Such a structure of the sliding section is considered to be formed in the following manner.

Figure 14:
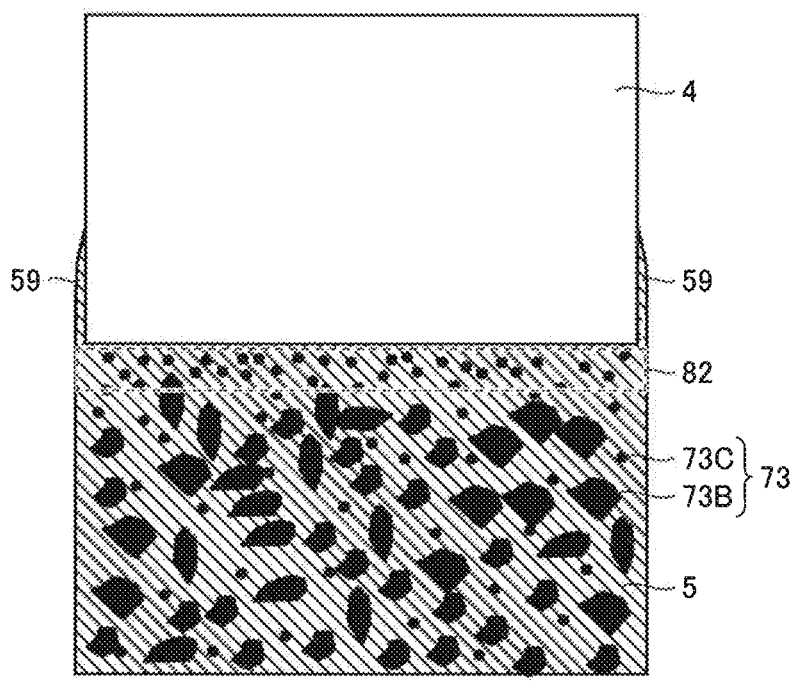
FIG. 14 is a schematic diagram showing the distribution state of precipitates in the sliding section of the piston shoe.

FIG. 14 is a schematic diagram showing the distribution state of precipitates within the sliding section of the piston shoe. In the friction step in the enclosed friction welding explained in the above embodiment, the base member 4 rotates while being pressed against the sliding member 5. Referring to FIG. 14, there exist large-sized precipitates 73B and small-sized precipitates 73C in the sliding member 5 made of high-strength brass. Before initiation of the friction step, the large-sized precipitates 73B and the small-sized precipitates 73C are mixed and distributed uniformly. At the initial stage of the friction step, the region in the vicinity of the contact surface is heated by frictional heat.

Thereafter, a contact-surface vicinity region 82 of the sliding member 5 corresponding to the sliding section joint region softens by the frictional heat over time. As a result, the contact-surface vicinity region 82 starts deformation because of the contact load between the base member 4 and the sliding member 5. As the deformation proceeds, the large-sized precipitates 73B are broken into small-sized precipitates 73C. Consequently, in the contact-surface vicinity region 82, the large-sized precipitates 73B decrease, and the volume fraction of the small-sized precipitates 73C increases. At this time, part of the deformed sliding member 5 is adhered to the outer peripheral surface of the base member 4 as a small amount of burr 59.

As the time further passes, the contact-surface vicinity region 82 that has softened by the frictional heat deforms completely and, as shown in FIG. 14, the small-sized precipitates 73C are closely packed in the deformed contact-surface vicinity region 82. It is thus considered that the precipitate aggregate 73A as the aggregate of fine precipitates is formed in that region within the sliding section joint region which is in contact with the sliding section joint surface (in the vicinity of the joint interface in A-2, B-2, C-2, and D-2). It is also considered that, as the plastically deformed contact-surface vicinity region 82 is heated again in the nitrocarburizing step, the sliding section joint region having a higher volume fraction of α phase than other regions is formed.

Example 2

A test piece was prepared by joining a base member made of steel (JIS SCM440H) and a sliding member made of high-strength brass by enclosed friction welding, through the procedure similar to that in the present embodiment. The test piece was subjected to a shear test to perform an experiment for confirming the strength of the joint portion. The test was conducted in the following manner.

Figure 15:
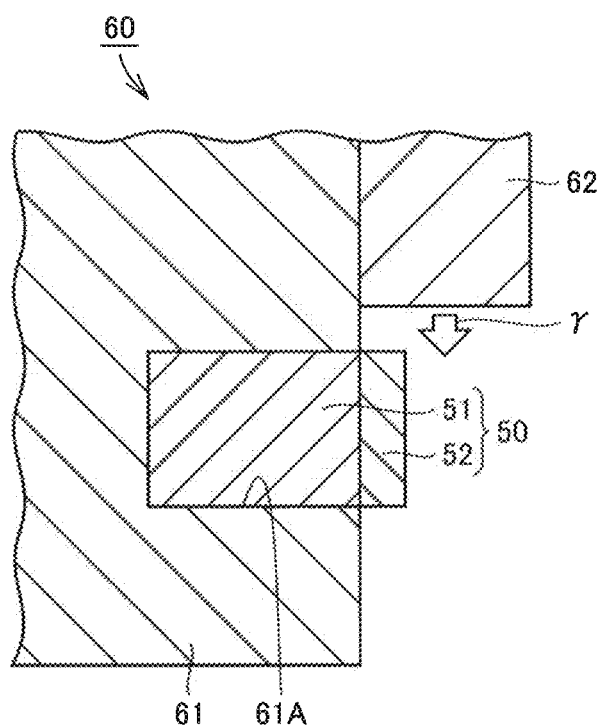
FIG. 15 is a schematic cross-sectional view illustrating a method for testing shear strength.

FIG. 15 is a schematic cross-sectional view illustrating the method for testing shear strength. Referring to FIG. 15, a test piece 50 has a structure in which a base member 51 made of steel and a sliding member 52 made of high-strength brass are joined by enclosed friction welding, as in the above embodiment. A shear testing device 60 includes a main body 61 having a test-piece holding portion 61A which is a recessed portion for holding a test piece, and a load applying portion 62 which applies load to the test piece 50. The test-piece holding portion 61A has a shape that receives the base member 51 alone, causing only the sliding member 52 to protrude from the test-piece holding portion 61A. The load applying portion 62 can be lowered in the direction indicated by an arrow γ, to apply load in the direction along the joint interface between the base member 51 and the sliding member 52. Two test pieces were prepared, and the stress (shear stress) at the time point when the respective one of the test pieces was broken was calculated (Examples A and B). Further, for comparison, test pieces were also prepared by placing a powder compact between a base member 51 and a sliding member 52 and sinter-bonding the base member 51 and the sliding member 52. The test pieces were subjected to a similar test (Comparative Examples A and B).

Figure 16:
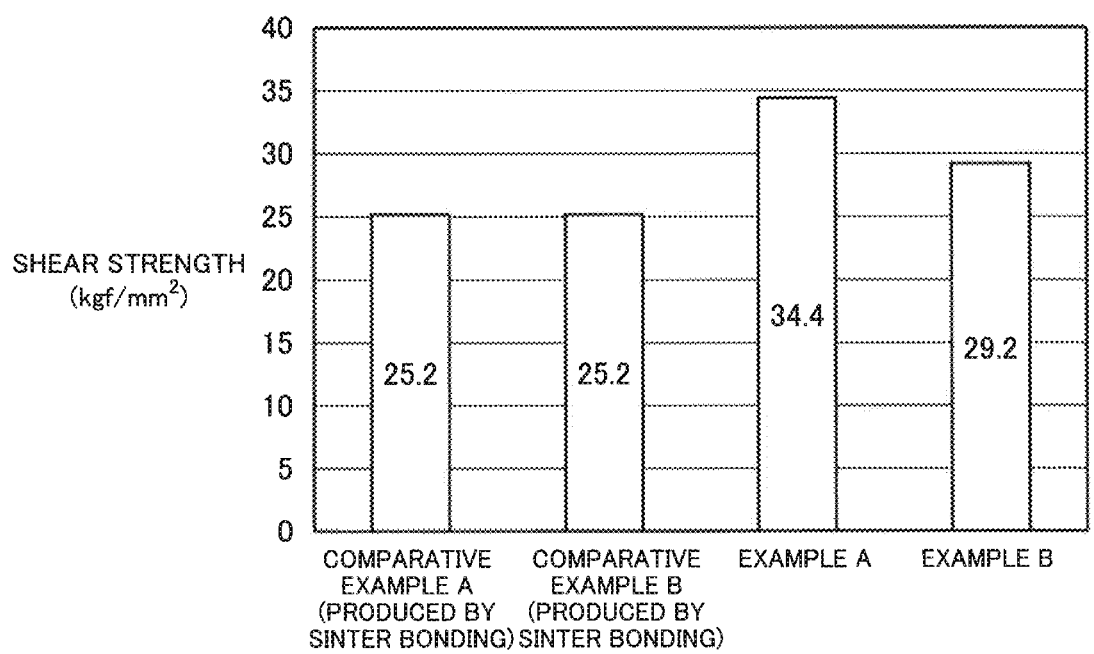
FIG. 16 shows the results of the shear strength test.

FIG. 16 shows the results of the shear strength test. Referring to FIG. 16, while the shear strength of the comparative examples having the structure similar to that of a conventional piston shoe was 25.2 kgf/mm$^2$, the shear strength of the examples produced by enclosed friction welding was 29.2 to 34.4 kgf/mm². Such strength is far greater than that of a conventional one, and is comparable to that of the base material. From the experimental results described above, it has been confirmed that according to the method for producing a sliding member in the present invention, it is possible to provide a sliding component having the sliding section firmly fixed to the base section.

It should be understood that the embodiments and examples disclosed herein are illustrative and non-restrictive in every respect. The scope of the present invention is defined by the terms of the claims, rather than the description above, and is intended to include any modifications and improvements within the scope and meaning equivalent to the terms of the claims.

INDUSTRIAL APPLICABILITY

The sliding component, the method for producing a sliding component, and the device for producing a sliding component of the present invention are applicable particularly advantageously to the sliding component having a base section made of steel or cast iron and a sliding section made of copper alloy and to the production thereof.

DESCRIPTION OF REFERENCE NUMERALS

1: piston shoe; 1A: surface; 2: base section; 3: sliding section; 4: base member; 4A: base member contact surface; 4B: disk portion; 4C: cylindrical portion; 5: sliding member; 5A: sliding member contact surface; 9: enclosed friction welding device; 21: spherical portion; 21A: flat part; 22: disk portion; 23: base section joint surface; 24: base section joint region; 29: center hole; 29A: first region; 29B: second region; 29C: third region; 29D: fourth region; 31: sliding surface; 31A: groove; 32: sliding section joint surface; 34: sliding section joint region; 50: test piece; 51: base member; 52: sliding member; 59: burr; 60: shear testing device; 61: main body; 61A: test-piece holding portion; 62: load applying portion; 71: α phase; 72: β phase; 73: precipitate; 73A: precipitate aggregate; 73B: large-sized precipitate; 73C: small-sized precipitate; 82: contact-surface vicinity region; 90: frame; 90A: shaft; 90B: spindle moving motor; 90C: spindle support portion; 91: base body; 92: jig holder; 92A: jig holding portion; 93: restraint jig; 93A: holding portion; 93B: gap; 94: chuck; 95: spindle; 95B: spindle motor; 96: load sensor; 97: spacing adjusting portion; 98: base portion; and 99: part.

The invention claimed is:

1. A sliding component, comprising:
a sliding section having a sliding surface, and made of copper alloy; and
a base section made of steel or cast iron, and joined to the sliding section,
the base section, including:
  a base section joint surface that is a surface joined to the sliding section; and
  a base section joint region including the base section joint surface and having smaller grains than other regions in the base section,
  wherein the base section joint region has a thickness, in a direction perpendicular to the base section joint surface, that is greater in a region including an outer surface of the sliding component than in an inside of the sliding component, and
the sliding section including:
  a sliding section joint surface that is a surface joined to the base section; and
  a sliding section joint region including the sliding section joint surface and having a lower hardness than other regions in the sliding section,
  wherein the sliding section joint region has a thickness, in a direction perpendicular to the sliding section joint surface, that is smaller than the thickness of the base section joint region.

2. The sliding component according to claim 1, wherein the sliding section joint region has a thickness of 0.2 mm or less in the direction perpendicular to the sliding section joint surface.

3. The sliding component according to claim 1, wherein the copper alloy is high-strength brass.

4. The sliding component according to claim 3, wherein the high-strength brass constituting the sliding section includes precipitates having a higher hardness than a matrix, and
the precipitates in the sliding section joint region are smaller in size than the precipitates in other regions in the sliding section.

5. The sliding component according to claim 4, wherein the sliding section joint region includes a precipitate aggregate as an aggregate of the precipitates in a region, within the sliding section joint region, that is in contact with the sliding section joint surface.

6. The sliding component according to claim 3, wherein the sliding section joint region has a higher volume fraction of a phase than other regions in the sliding section.

7. The sliding component according to claim 1, wherein the sliding section joint region has a thickness in the direction perpendicular to the sliding section joint surface that is substantially the same in the region including an outer surface of the sliding component and in an inside of the sliding component.

8. A method for producing a sliding component, comprising the steps of:
preparing a base member made of steel or cast iron and a sliding member made of copper alloy;
heating a region, within the base member, including a base member contact surface that is a surface of the base member coming into contact with the sliding member to a temperature not lower than the $A_1$ transformation point by causing the base member brought into contact with the sliding member to slide relatively to the sliding member to generate frictional heat; and
joining the base member and the sliding member by letting the region including the base member contact surface cooled to a temperature lower than the $A_1$ transformation point in the state where the heated base member is held in contact with the sliding member,
wherein in the step of heating the region including the base member contact surface to a temperature not lower than the $A_1$ transformation point and in the step of joining the base member and the sliding member, the sliding member is restrained on an outer peripheral side of a sliding member contact surface that is a surface of the sliding member coming into contact with the base member,
wherein the base member includes a base member joint surface that is a surface joined to the sliding member and a base member joint region including the base member joint surface and having smaller grains than other regions in the base member, the base member joint region having a thickness, in a direction perpendicular to the base member joint surface, that is greater in a region including an outer surface of the sliding component than in an inside of the sliding component, and wherein the sliding member includes a sliding member joint surface that is a surface joined to the base member and a sliding member joint region including the sliding member joint surface and having a lower hardness than other regions in the sliding member, the sliding member joint region having a thickness, in a direction perpendicular to the sliding member joint surface, that is smaller than the thickness of the base member joint region.

9. The method for producing a sliding component according to claim 8, wherein in the step of heating the region including the base member contact surface to a temperature not lower than the $A_1$ transformation point, the base member rotates relatively to the sliding member while being pressed against the sliding member, without changing its position relative to the sliding member.

10. The method for producing a sliding component according to claim 8, wherein the copper alloy is high-strength brass.

11. The method for producing a sliding component according to claim 10, further comprising the step of forming, in a region, within the sliding member, that is in contact with the sliding member contact surface, a region having a higher volume fraction of a phase than other regions in the sliding member by heating the sliding member in the state where the base member and the sliding member are joined.

\* \* \* \* \*